United States Patent
Thomas et al.

(10) Patent No.: US 6,808,456 B2
(45) Date of Patent: Oct. 26, 2004

(54) CONSTANT VELOCITY JOINT

(75) Inventors: Steven Mark Thomas, Saginaw, MI (US); William Paul Skvarla, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/308,539

(22) Filed: Dec. 3, 2002

(65) Prior Publication Data

US 2004/0106459 A1 Jun. 3, 2004

(51) Int. Cl.[7] ................................................. F16D 3/223
(52) U.S. Cl. ........................ 464/143; 464/139; 464/904
(58) Field of Search .............................. 464/139–145, 464/904, 906

(56) References Cited

U.S. PATENT DOCUMENTS

| | | | |
|---|---|---|---|
| 4,358,283 A | * 11/1982 | Kumpar | ...................... 464/143 |
| 5,201,107 A | 4/1993 | Mazziotti | |
| 5,230,659 A | 7/1993 | Bird et al. | |
| 5,855,519 A | * 1/1999 | Kadota | ........................ 464/145 |
| 6,159,103 A | 12/2000 | Lu | |
| 6,186,899 B1 | 2/2001 | Thomas et al. | |
| 6,190,260 B1 | 2/2001 | Flores et al. | |
| 6,206,785 B1 | 3/2001 | Thomas | |
| 6,390,925 B1 | 5/2002 | Perrow | |
| 6,443,844 B1 | 9/2002 | Perrow | |
| 6,468,164 B2 | 10/2002 | Song | |
| 6,533,667 B2 | 3/2003 | Perrow et al. | |
| 6,533,668 B2 | 3/2003 | Mizukoshi et al. | |
| 6,582,313 B2 | 6/2003 | Perrow | |
| 6,616,537 B2 | 9/2003 | Thomas et al. | |
| 6,616,538 B2 | 9/2003 | Perrow | |

* cited by examiner

Primary Examiner—David Bagnell
Assistant Examiner—K. Thompson
(74) Attorney, Agent, or Firm—Michael D. Smith

(57) ABSTRACT

A constant velocity joint includes outer and inner races with mating part-spherical surfaces in which a single functional set of ball grooves are formed bearing a single torque-transmitting ball which is urged under an applied torque load toward one axial end of the joint. A retainer is carried by one of the two races or the shaft to which they are connected and acts on the ball to maintain the ball within the grooves during all angles of the joint.

13 Claims, 1 Drawing Sheet

CONSTANT VELOCITY JOINT

TECHNICAL FIELD

This invention relates to constant velocity joints of the type used to transmit torque at a constant velocity between two shafts through an angle.

BACKGROUND OF THE INVENTION

A typical constant velocity joint used to transmit torque between two shafts through an angle includes an outer race fixed to one of the shafts and having an inner part-spherical surface, an inner race disposed in the outer race and having an outer part-spherical surface spaced from the inner surface of the outer joint member, a plurality of axially extending, circumferentially spaced ball grooves that face one another and have centers of curvature which are axially offset on opposite sides of a center point of the joint defined by a common center of the inner and outer joint surfaces, and a plurality of torque-transmitting balls corresponding in number to the number of grooves sets and disposed one each in the opposing groove sets to enable angulation of the shafts while precluding relative rotation of the inner and outer races to effect transmission of torque through the joint. An annular ball cage is disposed in the gap between the inner and outer joint members and serves to guide the inner and outer surfaces of the joint members during angulation and to capture the balls within the grooves. Typically, the number of balls in corresponding group sets corresponds to either 6 or 8 in number.

Constant velocity joints of the general type described above are used in many automotive front wheel drive applications and have proven to be an effective, robust design. However, because of the many parts and surfaces to machine, such joints can be costly to manufacture.

It is an object of the present invention to provide a simplified constant velocity joint construction that eliminates many of the complex component parts and machined surfaces, while enabling the transmission of torque between two shafts through an angle of the joint.

SUMMARY OF THE INVENTION

A constant velocity joint constructed according to a presently preferred embodiment of the invention includes an outer race coupled to a first shaft and having a socket with a part-spherical inner surface, an inner race coupled to a second shaft and having a part-spherical outer surface engaging the part-spherical inner surface to provide relative angular movement of the races about a common joint center of the races. The joint includes torque-transmitting structure acting between the races to prevent relative rotation of the races for effecting transmission of torque between the shafts. Such torque-transmitting structure includes a single functional ball groove formed in the inner surface of the outer race and a single complementing ball groove formed in the outer surface of the inner race, together with a single torque-transmitting ball disposed in the grooves and urged by the grooves under torque load toward an axially end of the outer race. A retainer acts on the ball to maintain the ball within the grooves.

One advantage of the present invention is that a constant velocity joint is provided which eliminates the need for all but a single functional ball groove set, thus reducing machining costs and the time it takes to machine the races.

The present invention has the further advantage of providing a single functional torque-transmitting ball which is received in the single functional groove set which enables angulation of the races while eliminating relative rotation of the joints to effect the transfer of torque through the joint, thus further reducing the cost and complexity of the joint.

The invention has the further advantage of eliminating the usual ball cage that is typically carried between the inner and outer race and formed with a number of windows for capturing a plurality of balls. The elimination of the ball cage further simplifies the construction and reduces the cost of manufacturing constant velocity joints.

A constant velocity joint constructed according to the present invention is particularly useful in applications where the joint is subjected to low torque load and low angulation. In such applications, there is no need to provide numerous ball grooves sets and balls and a ball cage to hold them in place according to the present invention, which achieves the functionality of traditional constant velocity joints but by means of a much simpler construction.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
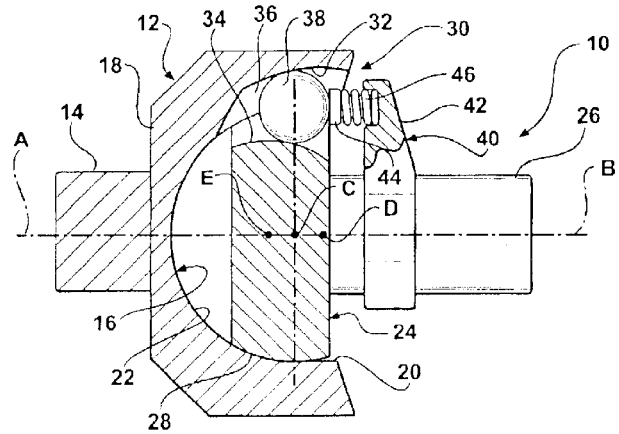
FIG. 1 is a fragmentary elevation view, shown partially in section, of a constant velocity joint constructed according to a first embodiment of the invention.

A constant velocity joint constructed according to a first presently preferred embodiment of the invention is shown generally at 10 in FIG. 1 and comprises an outer housing or race 12 coupled to a first shaft 14 having an axis A. The outer race 12 has a socket 16 which is closed at one axial end 18 and connected to the first shaft 14 and open at the opposite axial end 20 at a location axially beyond the end of the first shaft 14 at its connection point with the outer race 12. The socket 16 has a part-spherical inner surface 22 which extends to the open end 20.

The joint assembly 10 further includes an inner joint or race 24 which is disposed in the socket 16 of the outer race 12 and is coupled to a second shaft 26 having an axis B. The inner race 24 has a part-spherical outer surface 28 which directly engages the part-spherical surface 22 of the outer race 12 to provide a connection between the races 12, 14 that enables them to angulate relative to one another from a position in which axes A, B are coaxially aligned to positions where the axes are misaligned but, in each position, intersect at a common center point C of the joint 10. As such, the part-spherical surfaces 22, 28 share the common center point C which forms the fixed center point of angulation of the joint 10.

The joint assembly 10 further includes torque-transmitting structure 30 acting between the races 12, 24 to prevent relative rotation of the races 12, 24 to effect transmission of torque between the shafts 14, 26. The torque-transmitting structure 30 includes a single functional ball groove 32 formed in the inner surface 22 of the outer race 12, in combination with a single functional ball groove 34 formed in the outer surface 28 of the inner race 24 opposite the ball groove 32 to define a single functional ball track 36 between the outer and inner races 12, 24. A single functional torque-transmitting ball is disposed in the ball track 36 and is urged by the grooves 32, 34 under an applied torque toward the open axial end of the socket 16.

The ball groove 32 of the outer race 12 has a center of curvature D which is axially offset from one side of the center point C, and the ball groove 34 has a center of curvature E which is axially offset from the center point C on the opposite side from that of the center point D. The offset nature of the ball groove centers D, E with respect to the center point C maintain the ball 38 in a plane common with that of the center point C through all angles and provide the transmission of torque with constant velocity through different operating joint angles of the joint assembly 10 between the axes A, B of the shafts 14, 26. The offset arrangement of the ball grooves 32, 34 further serves to act on the ball 38 under the applied torque load in such manner as to urge the ball 38 axially in one direction. It will be seen from FIG. 1 that the offset ball centers B, E of the ball grooves 32, 34 have the effect of presenting the ball track 36 with an axially widening profile in one direction, which is narrower than the diameter of the ball 38 at one end, and wider than the diameter of the ball 38 at the opposite widest end. In the first embodiment, the ball track 36 widens in the direction of the open end 20 of the socket 16, such that the ball track 36 is narrower adjacent the closed end 18, and widest adjacent the open end 20. Under torque, the ball 38 is urged by the ball grooves 32, 34 acting on the ball 38 axially in the widening direction toward the open end 20 of the socket 16.

The joint assembly 10 further includes a ball retainer 40 which acts on the ball 38 to maintain the ball within the ball track 36 through all angles of the joint assembly 10. The ball retainer 40 according to the first embodiment of the invention is carried by the second shaft 26 and acts on the ball 38 in radially spaced relation to the ball grooves 32, 34. The retainer 40 includes a retainer body 42 disposed axially adjacent and spaced from the ball 38 adjacent the wide end of the ball track 36. A plunger 44 is supported by a spring 46 off the retainer body 42 and engages the ball 38 to exert a constant axial inward force parallel to the second shaft axis B in order to maintain the ball 38 within the ball track 36 in contacting rolling engagement with each of the ball grooves 32, 34 in a plane passing through the center point C of the joint assembly 10 through all joint angles between the shafts 14, 26.

Figure 2:
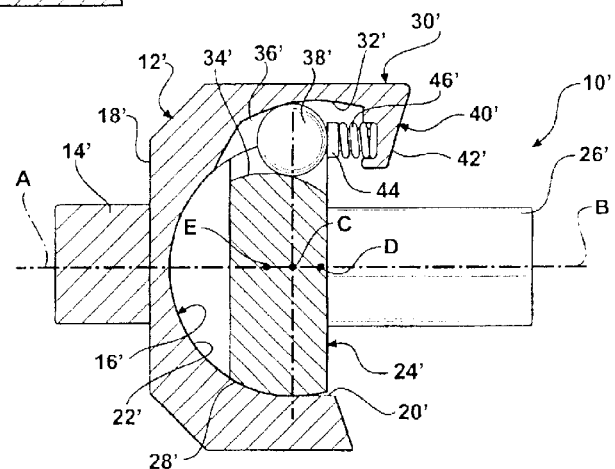
FIG. 2 is a view like FIG. 1 but of a second embodiment of the invention.

FIG. 2 discloses a second embodiment of the invention which is identical in construction to that of the constant velocity joint 10 of the first embodiment of FIG. 1, except that the retainer is carried off the outer race. For the second embodiment of FIG. 2, the same reference numerals are used to designate like components and features, but are primed. The retainer 40' of the second embodiment of the joint assembly 10' of FIG. 2 has the retainer body 42' extending from the outer race 12' in axially spaced relation to the ball 38' adjacent the wide end of the ball track 36', rather than on the second shaft 26' as in the first embodiment, and carries the same plunger 44' and spring 46 arrangement which acts on the ball 38' to urge the ball 38' axially inwardly of the ball track 36 toward the narrow end to maintain the ball 38' in contacting rolling engagement with the ball grooves 32', 34' through all angles of the joint assembly 10' in a plane common with the center point C' of the joint assembly 10. Apart from the construction and orientation of the retainer 40', the joint 10' operates identically to that of the joint 10 of FIG. 1.

Figure 3:
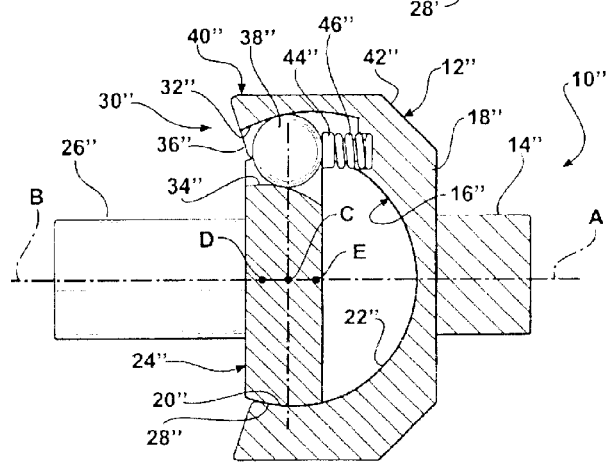
FIG. 3 is a view like FIG. 1 but of a third embodiment of the invention.

FIG. 3 illustrates another alternative embodiment of the invention, in which the same reference numerals are used to designate like features and components as that of the first embodiment of FIG. 1, but are double primed. It will be seen that the ball grooves 32", 34" of the outer 12" and inner 24" races have the groove centers E", F" which are offset on opposite axial sides of the center point C", but opposite that of the first embodiment, such that the ball track 36" widens inwardly of the socket 16" toward the closed end 18", rather than outwardly toward the open end 20", as in the first two embodiments. Applied torque acting on the ball 38" thus urges the ball 38" axially inwardly toward the closed end 18". The retainer 40" is disposed within the socket 16" and includes the retainer body 42" carried by the outer race 12" in axially spaced relation to the ball 38" and supports a similar plunger 44" and spring 46" which acts on the ball 38" to urge it axially outwardly with respect to the open end 20" toward the narrow end of the ball track 36" so as to maintain the ball 38" in rolling contact with the ball grooves 32", 34" in a plane common with the joint center C through all angles of the joint 10".

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A constant velocity joint comprising:
   an outer race coupled to a first shaft and having a socket with a part-spherical inner surface;
   an inner race coupled to a second shaft and having a part-spherical outer surface directly engaging said part-spherical inner surface to provide relative angular movement of said races about a common joint center of said races; and
   torque-transmitting structure acting between said races to prevent relative rotation of said races for effecting transmission of torque between said shafts, said torque-transmitting structure having a single functional ball groove formed in said inner surface of said outer race, a single complementing functional ball groove formed in said outer surface of said inner race opposite the ball groove of the outer race to define a single functional ball track, a single torque-transmitting ball disposed in said ball track and urged by said grooves under torque load toward an axial end of said socket, and a retainer acting directly on said ball to maintain said ball within said ball track.

2. The constant velocity joint of claim 1 wherein said retainer is carried by said second shaft.

3. The constant velocity joint of claim 1 wherein said retainer is carried by said outer race.

4. The constant velocity joint of claim 1 wherein said ball grooves have offset centers of curvature disposed on opposite sides of said joint center.

5. The constant velocity joint of claim 4 wherein said ball track widens in the axial direction of said first shaft.

6. The constant velocity joint of claim 5 wherein said retainer is carried by said outer race.

7. The constant velocity joint of claim 4 wherein said ball track widens in the axial direction of said second shaft.

8. The constant velocity joint of claim 7 wherein said retainer is carried by said outer race.

9. The constant velocity joint of claim 7 wherein said retainer is carried by said second shaft.

10. The constant velocity joint of claim 1 wherein said ball track widens in an axial direction of said races.

11. The constant velocity joint of claim 10 wherein said retainer includes a spring.

12. The constant velocity joint of claim 11 wherein said spring is disposed adjacent a wide end of said ball track.

13. A constant velocity joint comprising:

an outer race coupled to a first shaft and having a socket with a part-spherical inner surface:

an inner race coupled to a second shaft and having a part-spherical outer surface directly engaging said part-spherical inner surface to provide relative annular movement of said races about a common joint center of said races; and torque-transmitting structure acting between said races to prevent relative rotation of said races for effecting transmission of torque between said shafts, said torque-transmitting structure including a single functional ball groove formed in said inner surface of said outer race, a single complementing functional ball groove formed in said outer surface of said inner race opposite the ball groove of the outer race to define a single functional ball track, a single torque-transmitting ball disposed in said ball track and urged by said grooves under torque load toward an axial end of said socket, and a retainer acting directly on said ball to maintain said ball within said ball track, wherein said ball track widens in an axial direction of said races, said retainer includes a spring disposed adjacent a wide end of said ball track; and said retainer includes a ball cup supported by said spring and engaging said ball to exert a constant axial force on said ball within said ball track.

* * * * *